(12) United States Patent
Kitada et al.

(10) Patent No.: US 8,724,151 B2
(45) Date of Patent: May 13, 2014

(54) ENTERPRISE CLOUD PRINTING

(75) Inventors: Hiroshi Kitada, Tuckahoe, NY (US);
Lana Wong, Randolph, NJ (US)

(73) Assignee: Ricoh Company, Ltd., Tokyo (JP)

( * ) Notice: Subject to any disclaimer, the term of this patent is extended or adjusted under 35 U.S.C. 154(b) by 114 days.

(21) Appl. No.: 13/412,302

(22) Filed: Mar. 5, 2012

(65) Prior Publication Data

US 2013/0229680 A1 Sep. 5, 2013

(51) Int. Cl.
*G06F 15/00* (2006.01)
(52) U.S. Cl.
USPC .......................................................... 358/1.15
(58) Field of Classification Search
USPC ......................................................... 358/1.15
See application file for complete search history.

(56) References Cited

U.S. PATENT DOCUMENTS

2006/0103869 A1* 5/2006 Kato ............................ 358/1.13
2013/0021648 A1* 1/2013 Scaff ........................... 358/1.15

* cited by examiner

*Primary Examiner* — Saeid Ebrahimi Dehkordy
(74) *Attorney, Agent, or Firm* — Oblon, Spivak, McClelland, Maier & Neustadt, L.L.P.

(57) ABSTRACT

A method for monitoring usage of a home printer in a home-office system, the home-office system including the home printer and a computer of a user, both of which are communicatively coupled to an enterprise server over a network. The method includes generating a print job to be printed on the home printer; determining print job metrics related to the print job, the print job metrics including file information related to at least one file to be printed as part of the print job; and transmitting the print job metrics to the enterprise server over the network. A print management server analyzes the print job metrics to determine whether the print job was work-related or non-work-related.

8 Claims, 4 Drawing Sheets

Enterprise Network System

ENTERPRISE CLOUD PRINTING

FIELD

Embodiments disclosed herein generally relate to a method and system for an enterprise to manage printers set in a home-office environment.

BACKGROUND

In a conventional office setting, an IT manager manages the use of printers located on a local area network in the offices of an enterprise by using a device management tool. For example, the IT manager will manage the quality of printing, the usage of the printers by different groups or departments, the use of color printers, etc. for all users and printers within the enterprise.

In some global companies, as many as one-third of the workers work from home. In a typical home-office computing environment, as shown in FIG. 1, each of a plurality of home-office workers has a PC and a printer at home. Each home-office worker can connect to the enterprise computer network using a VPN application to perform his/her work, but the home-office printer is not typically connected to the device management tool of the company. The home-office worker can locally print both work-related and non-work-related documents on the printer located at the worker's home. Typically, the home office worker will purchase his/her own printer supplies (ink, toner, paper, etc.) and will submit an expense report to the enterprise for reimbursement. However, in this system, the corporate IT manager can not determine how much of the printer-related supply cost is attributable to work-related printing and how much is attributable to private printing use. Thus, the enterprise is generally forced to pay for all of the printing supplies purchased by the home-office worker. Accordingly, there is a need for a method and system for monitoring and managing the use of home-office printers by employees of an enterprise.

SUMMARY

One embodiment of the embodiments disclosed herein is a method for monitoring usage of a home printer in a home-office system, the home-office system including the home printer and a computer of a user, both of which are communicatively coupled to an enterprise server over a network, the method comprising: (1) generating, at the computer of the user, a print job to be printed on the home printer; (2) determining print job metrics related to the print job, the print job metrics including file information related to at least one file to be printed as part of the print job; and (3) transmitting the print job metrics to the enterprise server over the network via a firewall, wherein the enterprise server is a private server of an enterprise.

Further, the method comprises establishing, over the network, a private connection to the enterprise server, and logging in to the enterprise server; and receiving parameter settings from the enterprise server, the parameter settings indicating information fields to be included in the print job metrics determined in the determining step The file information includes at least one of file name, file type, and file size of the at least one file to be printed. The print job metrics further include (1) user information, including at least one of a user name and a user location, and (2) time and date information of the print job.

Another embodiment of the embodiments disclosed herein is a processing apparatus configured to monitor usage of a home printer in a home-office system, the home-office system including the home printer and a computer, both of which are communicatively coupled to an enterprise server over a network, the device comprising: (1) a processor configured to generate a print job to be printed on the home printer and to determine print job metrics related to the print job, the print job metrics including file information related to at least one file to be printed as part of the print job; and (2) a communication device configured to transmit the print job metrics to the enterprise server over the network via a firewall, wherein the enterprise server is a private server of an enterprise.

Further, the communication device is configured to establish, over the network, a private connection to the enterprise server, and to log in to the enterprise server over the network; and the communication device is configured to receive parameter settings from the enterprise server, the parameter settings indicating information fields to be included in the print job metrics determined by the processor.

Another embodiment of the embodiments disclosed herein is a method for monitoring usage of a home printer in a home-office system, the home-office system including the home printer and a computer of a user, both of which are communicatively coupled to an enterprise server over a network, wherein the enterprise server is a private server of an enterprise, the method comprising: (1) generating, at the computer, a print job to be printed on the home printer; (2) determining print job metrics related to the print job, the print job metrics including file information related to at least one file to be printed as part of the print job; (3) storing the print job metrics; (4) determining, based on a setting by the user, whether the user wants to transmit the print job metrics to the enterprise server; and (5) transmitting the print job metrics to the enterprise server over the network via a firewall, when it is determined in the determining step that the user wants to transmit the print job metrics to the enterprise server.

Still another embodiment of the embodiments disclosed herein is a method executed by a home printer in a home-office system, the home-office system including the home printer and a computer of the user, both of which are communicatively coupled to an enterprise server over a network via a firewall, wherein the enterprise server is a private server of an enterprise, the method comprising: (1) establishing a private connection with the enterprise server and initiating a log-in sequence with the enterprise server; (2) receiving, via the private connection, a processed print job transmitted from the enterprise server; (3) printing the processed print job; and (4) transmitting a print job result to the enterprise server via the private connection.

Further, another embodiment of the embodiments disclosed herein is a method executed by a print management server communicatively coupled to an enterprise server over a network, the method comprising: (1) receiving a print job result corresponding to a print job executed on a home printer in a home-office system, the print job result being transmitted from the enterprise server over the network via a firewall, wherein the enterprise server is a private server of an enterprise; (2) receiving print job metrics associated with the print job, the print job metrics being transmitted from the enterprise server over the network, wherein the print job metrics were determined by a computer in the home-office system and transmitted to the enterprise server; and (3) analyzing the print job metrics to determine whether the print job was work-related or non-work-related.

In this embodiment, the method further includes determining parameter settings indicating which of a plurality of print job metrics should be obtained by the computer in the home-office system; and transmitting the determined parameter settings to the enterprise server for transmission to the computer.

Further, another embodiment of the embodiments disclosed herein is a method for monitoring usage of a home printer in a home-office system by an enterprise server, the home-office system including the home printer and a computer of a user, the method comprising: (1) establishing a first private connection to the computer over a network via a firewall; (2) establishing a second private connection to the home printer over the network via the firewall; (3) receiving, from the computer over the first private connection, print job metrics related to a print job generated at the computer, the print job metrics including file information related to at least one file to be printed as part of the print job; (4) determining, based on the received print job metrics, whether the print job must be processed by the enterprise server or can be processed by the computer; (4) transmitting, to the computer via the first private connection, an instruction to process and print the print job, when it is determined in the determining step that the print job can be processed by the computer; and (5) transmitting, to the computer via the first private connection, a request for print job data, when it is determined in the determining step that the print job must be processed by the enterprise server.

Further, the method comprises forwarding the print job metrics to a print management system.

Further, the method comprises (1) receiving, from the computer via the first private connection, the print job data; (2) processing the print job data to generate processed print job data; and (3) transmitting, to the home computer via the second private connection, the processed print job data.

BRIEF DESCRIPTION OF THE DRAWINGS

A more complete appreciation of the inventions and many of the attendant advantages thereof will be readily obtained as the same becomes better understood by reference to the following detailed description when considered in connection with the accompanying drawings, wherein.

DETAILED DESCRIPTION

Figure 1:
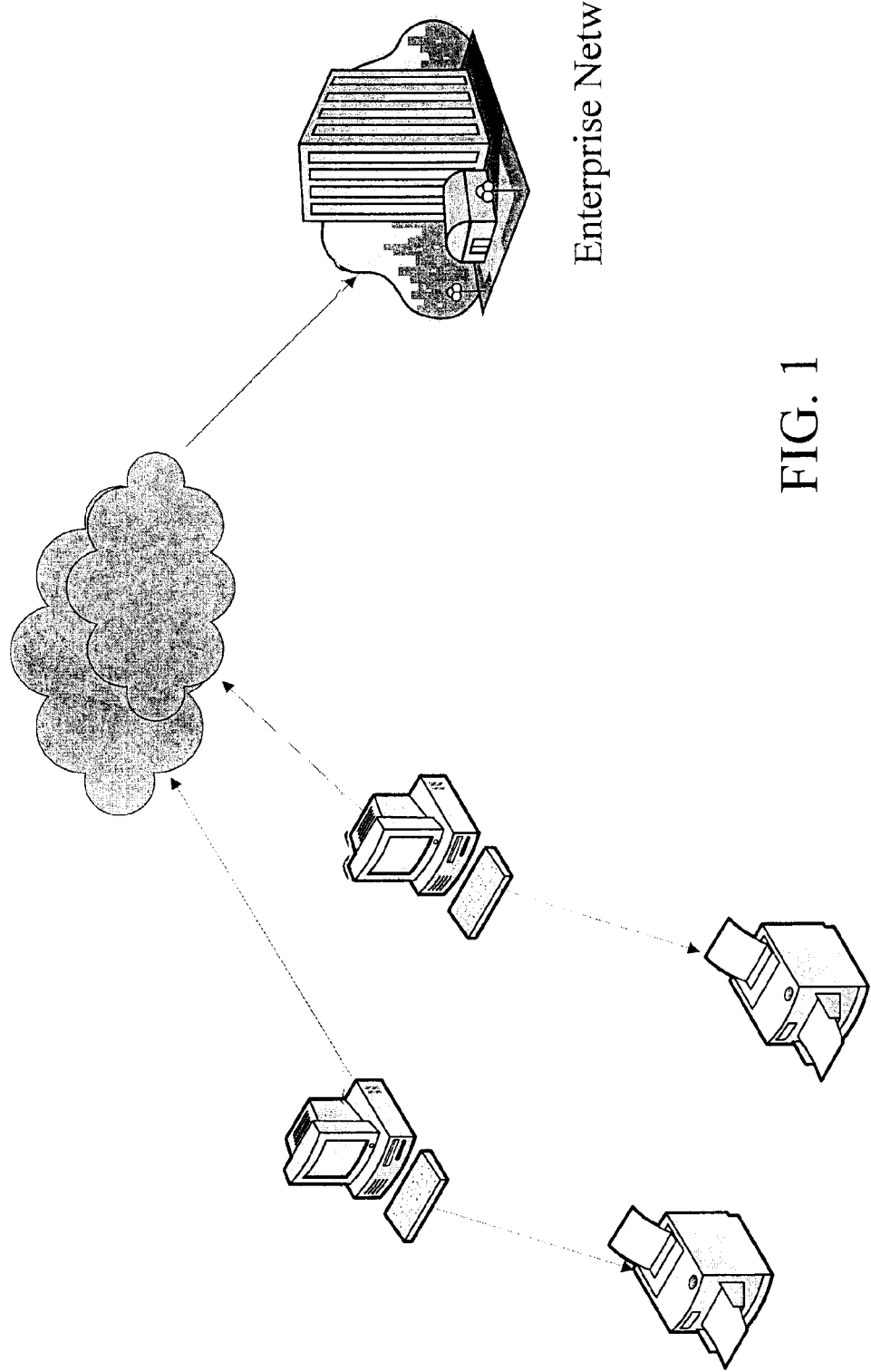
FIG. 1 illustrates a home-office printing environment.
Figure 2:
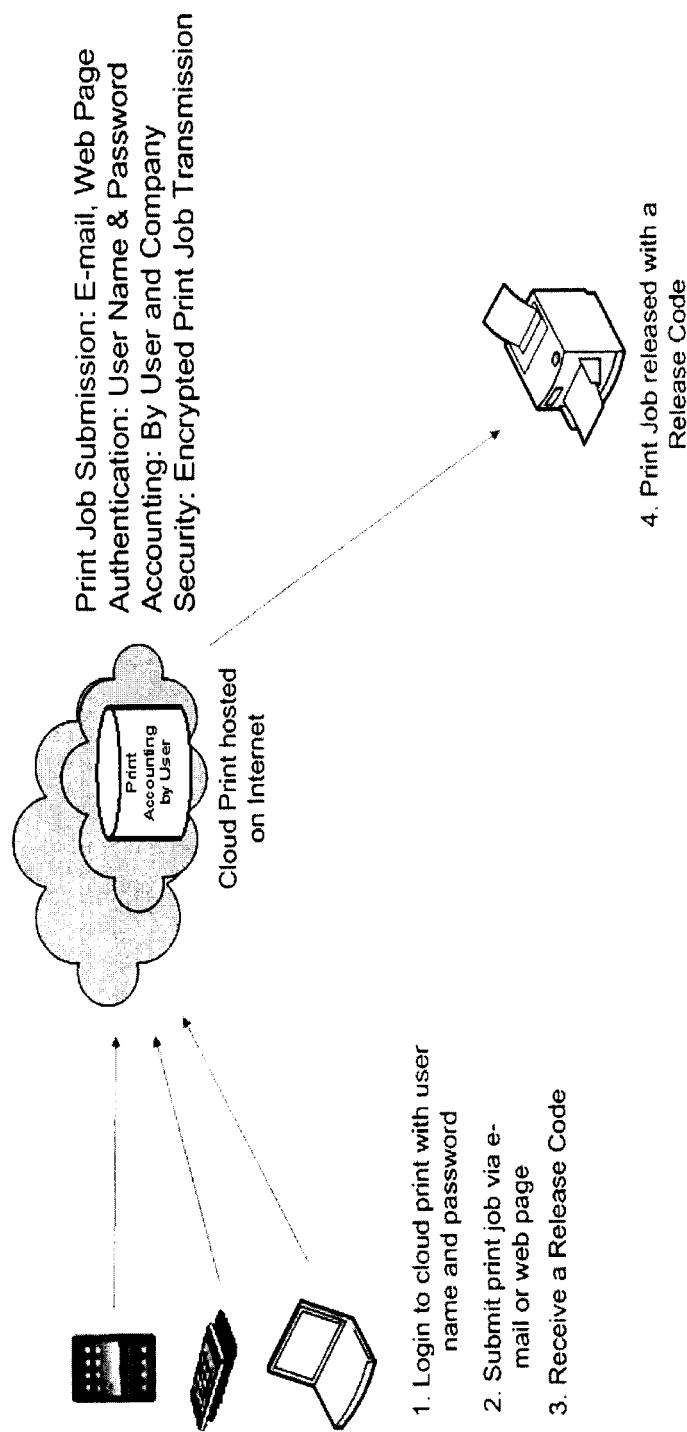
FIG. 2 illustrates a public cloud-based printing system.

FIG. 2 illustrates a cloud-based printing system in which a user is able to print a document from any location and from any device. For example, the system shown in FIG. 2 can be used by home office workers to print work-related documents while traveling.

In particular, in this system, the user can send a print request from a personal computer (PC), a cell phone, a tablet computer, or other mobile terminal, to a cloud printing system hosted on the Internet. The cloud printing system can include one or more print servers in communication with one another. As shown in FIG. 2, the user logs in to the cloud printing system with, e.g., a user name and password. After successful user authentication, the user can submit a print job via email or via a website. In one embodiment, the user receives a release code that allows the user to print the document at any printer of a plurality of printers by entering the release code at the printer. Further, in this system, the print job may be transmitted in encrypted form for increased security.

Figure 3:
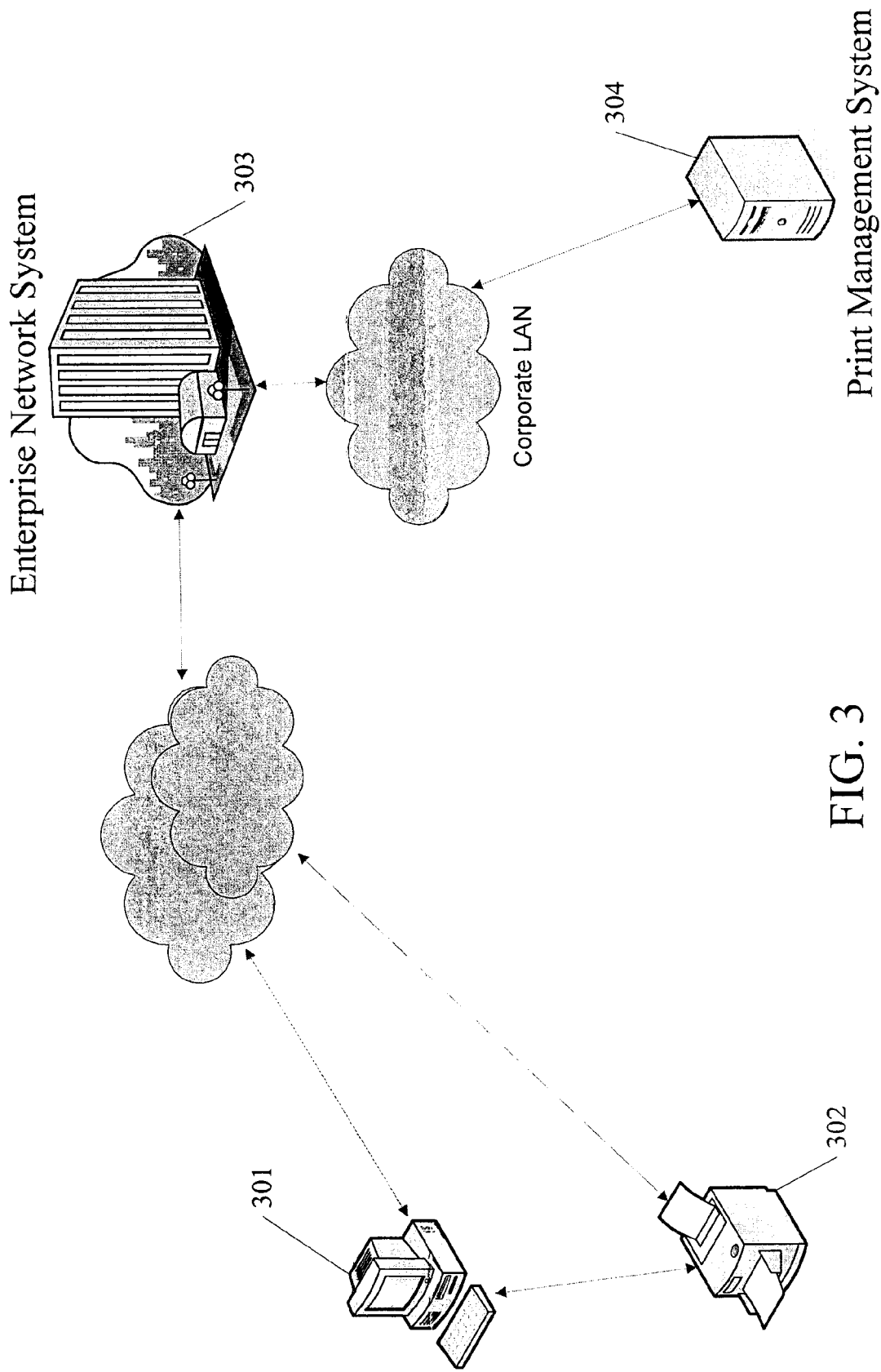
FIG. 3 illustrates a system for monitoring use of home-office printers by employees of an enterprise.

FIG. 3 illustrates a system for monitoring the use of home-office printers by employees of an enterprise according to one embodiment.

As shown in FIG. 3, each home-office worker uses a PC 301 in conjunction with a printer 302 to perform his/her work. Although only a single PC 301 and a single printer 302 are shown, the home-office worker can alternatively use multiple PCs or other computing devices and more than one printer, which can be arranged in a home-office network. The PC 301 is configured to communicate with the enterprise network system 303 either over a dedicated private communication line or via the Internet using VPN, for example. The enterprise network system includes an enterprise server that is protected by a firewall, and is not a public server.

The PC 301 also includes a print driver for sending and configuring print requests to the printer 301. The enterprise network system is connected, e.g., via a corporate LAN, to a print management system 304, which manages use of the printers of the enterprise. The printer 302 is configured to execute print jobs and includes a communication device to communicate with the enterprise network system 303 over the network. The printer also includes a CPU and a memory storing a computer program that when executed by the CPU causes the printer to login to the enterprise network system.

Figure 4:
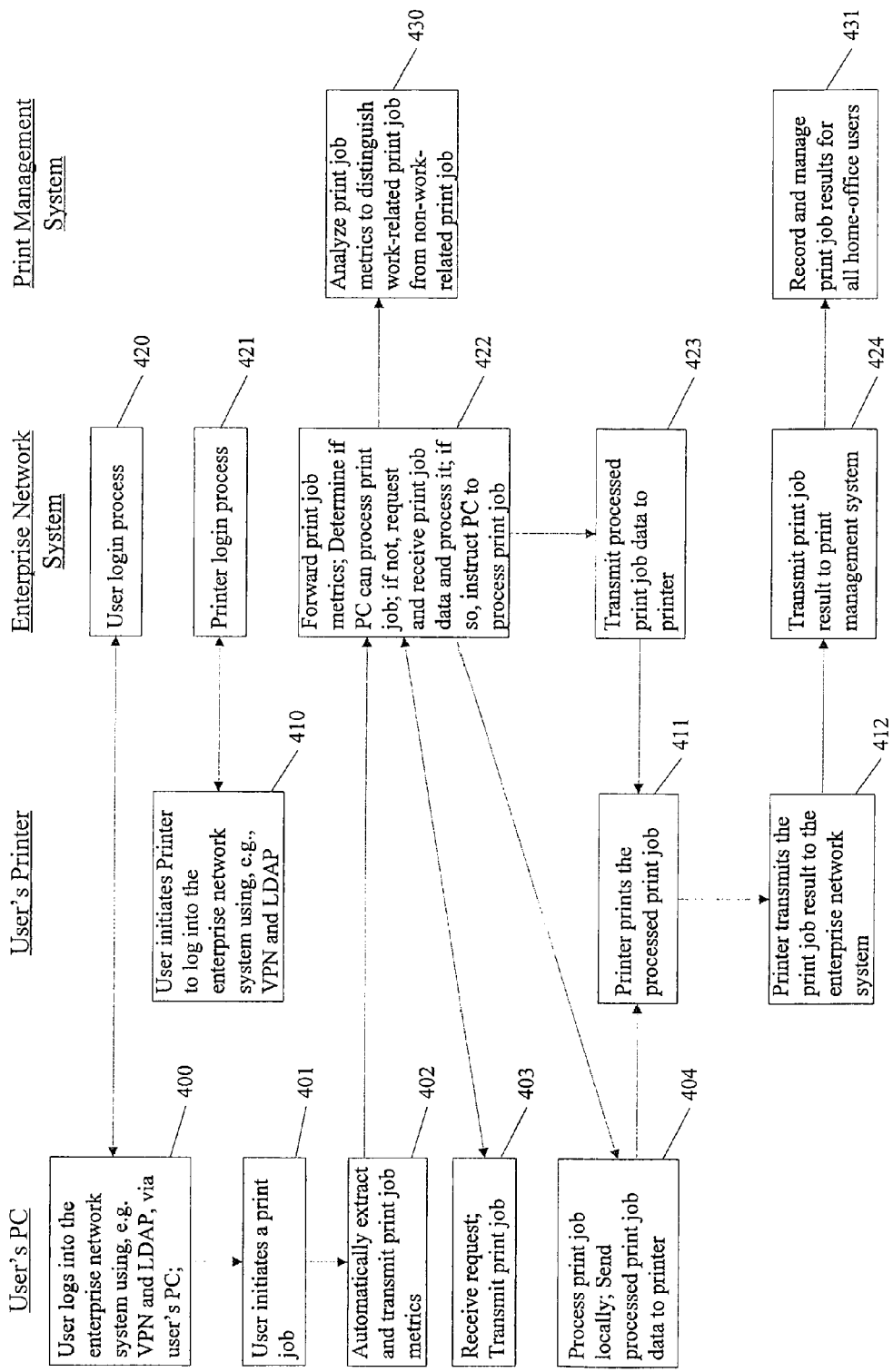
FIG. 4 is a flowchart of an overall method for monitoring the use of home-office printers by employees of an enterprise.

FIG. 4 is a flowchart of an overall method for monitoring the use of home-office printers by employees of an enterprise.

In step 400, a home-office worker (user) logs in to the enterprise network system 303 using, e.g., VPN and LDAP (Lightweight Directory Access Protocol), via the PC 301 using a user login process 420. As discussed in more detail below, the enterprise network system 303 can transmit, after the user logs in, various parameter values set by an IT manager for monitoring print jobs submitted by the user and for determining print job metrics.

In step 410, the user causes a log-in sequence to be performed between the user's printer and the enterprise network system. For example, the use might push a particular button or sequence of buttons on the printer to initiate the login sequence. In response, the printer 302 automatically logs in to the enterprise network system using, e.g., VPN and also logs in to the LDAP server, using the printer login process 421.

In step 401, the user initiates a print job from the PC 301.

In step 402, in response to the user initiating the print job, a monitoring application program running on the PC extracts print job data (metrics) related to the print job and stores the print job data in a memory. The print job data can include various data fields determined by the IT manager, including user information (user name, location, etc.), file information (file name, file size, file type, etc.), and time and date information. The types of data to be extracted and recorded by the monitoring application program are determined by the enterprise and can be dynamically set and pushed to each PC after each user logs in, or on a predetermined schedule.

Further, in this step, the print job data extracted by the PC 301 is transmitted by the PC to the enterprise network system through an internal firewall in the enterprise network system.

Note that the extracted print job data is not the print data itself. Further, note that step 402 must be performed after step 410.

Further, in step 402, the user PC transmits the extracted print job data (metrics) related to the print job to the enterprise network system.

In step 422, the enterprise network system receives the transmitted print job data (metrics) and determines, based on the print job data, whether the print job can be processed by a print driver at the user's PC. If so, the enterprise network system transmits an instruction to the user's PC indicating that the PC can proceed with processing the print job for printing on the printer. For example, if the print job relates to an application, such as word processing, that can be processed by print drivers on the PC, the enterprise network system instructs the user's PC to proceed with printing.

However, if by analysis of the print job data, the enterprise network system concludes that processing of the print job must be performed by the enterprise network system, the enterprise network system transmits a request to the user's PC for the print job (e.g., document data). After receiving the print job, the enterprise network system processes the print job to generate processed print job data suitable for printing on the user's printer.

In either case, the enterprise network system forwards the print job data (metrics) to the print management system.

In step 403, the user's PC receives the request for the print job and transmits the unprocessed print job (e.g., document data) to the enterprise network system.

In step 404, based on instructions received from the enterprise network system, the user's PC processes the print job to generate processed print job data suitable for printing on the user's printer. Further, in this step, the PC transmits the processed print job to the printer for printing.

In step 423, the enterprise network system transmits the processed print job to the printer for printing.

In step 411, the printer 302 prints the processed print job received from the PC 301 or from the enterprise network system 303.

In step 412, the printer 302 transmits the print job result to the enterprise network system 303.

In step 424, the enterprise network system 303 transmits the received print job result to the print management system 304.

In step 430, the print management system analyzes the received print job data (metrics) for the particular user to determine whether the corresponding print job was work-related or non-work-related so as to determine whether the user should be reimbursed for the cost of supplies associated with the print job. The print management system 304 can use various rules for determining whether the print job was work-related or non-work-related. For example, the file type or type of application used to created the printed file can be used to determine whether the print job was work-related or non-work-related. Each enterprise can formulate rules that are most appropriate for its home-office workers in this regard.

In step 431, the print management system 304 records the print job result.

In this way, the print management system can receive both print job results and associated print job data for all of the print jobs performed by all of the home-office workers, so as to more accurately monitor and manage all of the print jobs.

In an alternative embodiment, at the time of submitting a print job, the user can designate whether the print job data should be extracted and transmitted to the enterprise network system. In this embodiment, the interface of the print driver on the PC 301 gives the user the option of designating the print job as non-work-related (do not extract and send print job data) or work-related (extract and send print job data). If the print job is designated as non-work-related by the user and can be processed locally, the printer need not log-in to the enterprise network system, and need not transmit the print job result or any print job data related to the print job to the enterprise network system. Note, however, that whether the user is able to perform this designation is controlled by the IT manager in the parameter settings pushed to the PC 301. For example, based on the profile set by the enterprise IT manage, some enterprises will not give their home-office workers this option, while others will allow the home-office workers to designate whether the print job is non-work-related or work-related.

As one of ordinary skill in the art would recognize, the personal computer 301, the enterprise network system 303, and the print management system 304 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, each computing device includes a memory that may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory. The personal computer 301, the enterprise network system 303, and the print management system 304 include communication devices configured to allow the devices to communicate over the network using various application-layer communication protocols.

Alternatively, the CPU in the personal computer 301, the enterprise network system 303, and/or the print management system 304 may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art.

The personal computer 301, the enterprise network system 303, and the print management system 304 can include one or more displays, each of which can be implemented as an LCD display, CRT display, plasma display, OLED, LED or any other display known in the art. As such, the descriptions of the memory and the displays provided herein are merely exemplary and in no way limit the scope of the present advancements.

Further, the enterprise network system 303 and the print management system 304 can each be implemented by one or more servers coupled via a local area network. Each of the servers can perform one or more of the functions described herein so that cooperatively, the one or more servers perform all of the functions described herein. Alternatively, the functions described herein can be performed by other cloud-based servers separate from the enterprise network system or the print management system.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method for monitoring usage of a home printer in a home-office system, the home-office system including the home printer and a computer of a user, both of which are communicatively coupled to an enterprise server over a network, the method comprising:
   generating, at the computer of the user, a print job to be printed on the home printer;
   determining, automatically in response to generation of the print job, print job metrics related to the print job, the print job metrics including file information related to at least one file to be printed as part of the print job; and
   transmitting, prior to processing the generated print job, the print job metrics to the enterprise server over the network via a firewall, wherein the enterprise server is a private server of an enterprise.

2. The method of claim 1, further comprising:
   establishing, over the network, a private connection to the enterprise server, and logging in to the enterprise server; and
   receiving parameter settings from the enterprise server, the parameter settings indicating information fields to be included in the print job metrics determined in the determining step.

3. The method of claim 1, wherein the file information includes at least one of file name, file type, and file size of the at least one file to be printed.

4. The method of claim 1, wherein the print job metrics further include (1) user information, including at least one of a user name and a user location, and (2) time and date information of the print job.

5. A method for monitoring usage of a home printer in a home-office system, the home-office system including the home printer and a computer of a user, both of which are communicatively coupled to an enterprise server over a network, wherein the enterprise server is a private server of an enterprise, the method comprising:
   generating, at the computer, a print job to be printed on the home printer;
   determining print job metrics related to the print job, the print job metrics including file information related to at least one file to be printed as part of the print job;
   storing the print job metrics;
   determining, based on a setting by the user, whether the user wants to transmit the print job metrics to the enterprise server; and
   transmitting the print job metrics to the enterprise server over the network via a firewall, when it is determined in the determining step that the user wants to transmit the print job metrics to the enterprise server.

6. A method for monitoring usage of a home printer in a home-office system by an enterprise server, the home-office system including the home printer and a computer of a user, the method comprising:
   establishing a first private connection to the computer over a network via a firewall;
   establishing a second private connection to the home printer over the network via the firewall;
   receiving, from the computer over the first private connection, print job metrics related to a print job generated at the computer, the print job metrics including file information related to at least one file to be printed as part of the print job;
   determining, based on the received print job metrics, whether the print job must be processed by the enterprise server or can be processed by the computer;
   transmitting, to the computer via the first private connection, an instruction to process and print the print job, when it is determined in the determining step that the print job can be processed by the computer; and
   transmitting, to the computer via the first private connection, a request for print job data, when it is determined in the determining step that the print job must be processed by the enterprise server.

7. The method of claim 6, further comprising:
   forwarding the print job metrics to a print management system.

8. The method of claim 6, further comprising:
   receiving, from the computer via the first private connection, the print job data;
   processing the print job data to generate processed print job data; and
   transmitting, to the home computer via the second private connection, the processed print job data.

* * * * *